United States Patent
Hernández et al.

(10) Patent No.: US 6,476,966 B1
(45) Date of Patent: Nov. 5, 2002

(54) CONTINUOUSLY VARIABLE, WAVELENGTH-INDEPENDENT POLARIZATION ROTATOR

(75) Inventors: Florencio E. Hernández, Orlando, FL (US); David J. Hagan, Oviedo, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/654,931

(22) Filed: Aug. 31, 2000

Related U.S. Application Data

(60) Provisional application No. 60/170,799, filed on Dec. 15, 1999.

(51) Int. Cl.$^7$ ................................ G02B 5/30; G02F 1/02
(52) U.S. Cl. ................... 359/484; 359/500; 359/501; 359/900; 359/483; 349/193; 349/194
(58) Field of Search ........................ 359/253, 484, 359/500, 501, 254, 900, 483, 494; 349/18, 191, 193, 194; 385/140; 356/364, 370, 368

(56) References Cited

U.S. PATENT DOCUMENTS

| | | | | |
|---|---|---|---|---|
| 3,183,763 A | * | 5/1965 | Koester | 359/501 |
| 3,321,905 A | | 5/1967 | Krebs | 368/232 |
| 3,732,793 A | | 5/1973 | Tague | 396/544 |
| RE27,911 E | * | 2/1974 | Dreyer | 349/194 |
| 3,874,163 A | | 4/1975 | Ikeno | 368/242 |
| 4,247,930 A | | 1/1981 | Martin | 368/84 |
| 4,269,511 A | | 5/1981 | Erwin | 356/368 |
| 4,579,422 A | | 4/1986 | Simoni et al. | 349/176 |
| 4,877,321 A | * | 10/1989 | Ichihashi et al. | 351/214 |
| 4,901,140 A | | 2/1990 | Lang et al. | 348/816 |
| 4,943,851 A | | 7/1990 | Lang et al. | 348/37 |
| 5,276,747 A | * | 1/1994 | Pan | 385/34 |
| 5,319,481 A | | 6/1994 | Fergason | 349/171 |
| 5,486,940 A | * | 1/1996 | Fergason et al. | 349/194 |

OTHER PUBLICATIONS

"Achromatic Polarization Rotator", IBM Technical Disclosure Bulletin, vol. 13, No. 5, NN 70101211, Oct. 1970.*
J. Applied Physics, vol. 64, No. 2, pp. 614–628, Jul. 15, 1988 Hiap Liew Ong.

* cited by examiner

Primary Examiner—John Juba, Jr.
(74) Attorney, Agent, or Firm—Brian S. Steinberger; Law Offices of Brian S. Steinberger, P.A.

(57) ABSTRACT

A useful optical device to provide continuously variable rotation of polarization of linearly polarized light in a wavelength-independent manner. This device features a cell of twisted nematic liquid crystal sandwiched between an input window and a rotatable output window, both with surfaces prepared so as to orient the nematic liquid crystal molecules. This optical device has different applications such as: variable-angle polarization rotator; using broad band polarizers as an energy attenuator; working in both cases as a wavelength independent and temporal pulse width independent device. The low cost, the very wide field of view, the wavelength and pulse width independence, the high efficiency, and its mechanical simplicity make of this new optical device a very useful and novel invention.

16 Claims, 9 Drawing Sheets

CONTINUOUSLY VARIABLE, WAVELENGTH-INDEPENDENT POLARIZATION ROTATOR

This invention relates to an optical device useful for moderation of infrared, visible and ultraviolet radiation, and in particular to a novel optical device which can rotate the polarization of light by any desired angle, independent of the radiation wavelength, pulse width and incident angle and claims priority based on U.S. Provisional Application Serial No. 60/170,799 filed Dec. 15, 1999.

BACKGROUND AND PRIOR ART

Different optical devices such as polarizers and retarders have been developed to induce light polarization changes. Polarizers transmit only the component of input light with electric field vector oscillating parallel to the polarizer axis, while retarders introduce a phase shift between two orthogonal electric field components of the light. Polarizers and retardation plates are frequently used in combination to control laser intensity or polarization state for many different applications. For example, rotation of linear polarization can be achieved with half wave plate retardation. However, retardation plates are strongly dependent on radiation wavelength and have a small acceptance angle.

In recent decades liquid crystals (LC) have been thoroughly studied because of their interesting linear and non-linear optical properties. Nematic liquid crystals (NLC) are particularly interesting because of their high birefrigence. In these liquids, the molecules tend to align parallel to each other. By placing the liquid crystal in a cell with a specially oriented glass surface, the liquid crystal molecules align with the glass surface orientation. This makes the NLC a uniaxial birefringent medium with an optical axis along the direction of alignment. This direction is commonly defined by a unit vector known as the "director". A linearly polarized beam passing through such a NLC polarized at an angle $\Phi$ with respect to the director will generally have electric field components parallel to and perpendicular to the director. As the refractive index experienced by each of these components ($n_e$ and $n_o$ respectively) are different, there will be a relative phase shift between these components and the NLC behaves like a wave plate.

If the opposite glass window of the cell has also an oriented surface, the molecules at that side of the cell will align in the orientation of that surface. If the two orientations are different, the orientation of the LC will gradually change, forming a helix. This is known as a twisted nematic liquid crystal (TNLC). Hiap Liew Ong characterized the optical properties of general twisted nematic liquid crystals (TNLC) (see Ong, H. L., J. Appl. Phys. 64, 614 (1988)).

The principle of fixed-angle rotation has been used in conjunction with electrical alignment of TNLCs in liquid crystal display technology. If linearly polarized light is incident on a TNLC cell with polarization vector parallel to (or perpendicular to) the director vector at the entrance window, the polarization remains linear, following the rotation of the director vector and hence exits with linear polarization parallel to (or perpendicular to) the director vector at the direction of the exit window. This process, known as "adiabatic following", only occurs if the pitch of the helix is much greater than the radiation wavelength inside the LC, otherwise the light becomes elliptically polarized. Here the pitch is $P=(2\pi/\theta)L$, where $\theta$ is the rotational angle and L is the physical length of propagation through the LC. Half-wave plates, fabricated out of birefringent crystals such as quartz, calcite, mica, etc., can also be used to continuously rotate linear polarization, but these are inherently strongly wavelength dependent and have a narrow field of view.

Simoni et al in U.S. Pat. No. 4,579,422 used a cholesteric liquid crystal in a device that can continuously rotate linear polarization through angles up to 45° in response to an applied voltage, but this is a strongly wavelength dependent device.

The literature fails to disclose any optical device that can be used to continuously rotate linearly polarized light working simultaneously at all wavelengths, through any angle.

SUMMARY OF THE INVENTION

The first objective of the present invention is to provide an optical device, which can rotate the polarization of polychromatic light by any desired angle.

The second object of this invention is to provide an optical device, which can continuously rotate the polarization of polychromatic light to any desired angle.

The third objective of the present invention is to provide an optical device, which can rotate the polarization of light independent of the direction of propagation of the incident light.

The fourth objective of this invention is to provide an optical device, which can rotate the polarization of pulses of light, independent of the temporal duration of the pulses.

The fifth objective of this invention is to provide an optical device, which can rotate the polarization of polychromatic light and hence, when placed between broadband linear polarizers can control the power of any light source.

The sixth objective of this invention is to provide an optical device, which can rotate the polarization of polychromatic light, where that rotation may be switched on and off by means of an externally applied electrical voltage.

The preferred embodiment describes an optical device, comprising: a first light transparent window with an oriented inner surface; a second light transparent window with an oriented inner surface; twisted nematic liquid crystal disposed between said oriented surfaces of first and second windows; and, means for continuously rotating said windows whereby the direction of linear polarization of light transmitted through said device is altered.

Further objects and advantages of this invention will be apparent from the following detailed description of a presently preferred embodiment, which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
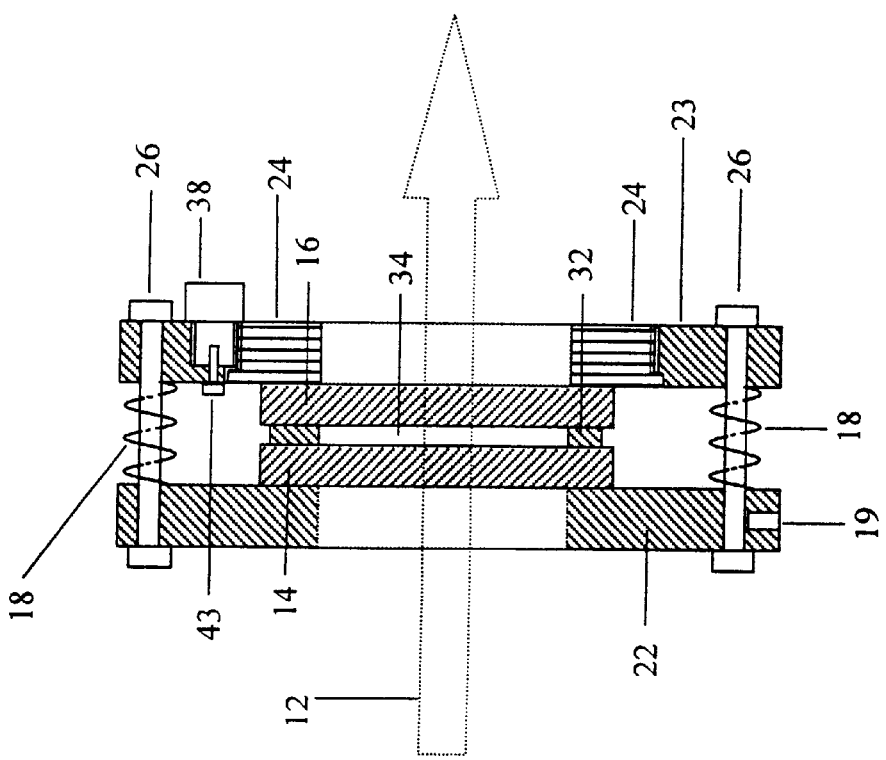
FIG. 1 shows a cross-sectional/side view of the optical device of the invention which is a continuously variable, wavelength-independent polarization rotator (CVW-IPR).

FIG. 1 shows the cross-sectional side view design of the optical device of the invention, which is a continuously variable, wavelength-independent polarization rotator (CVW-IPR). The CVW-IPR features a twisted nematic liquid crystal (TNLC) 34 disposed between input 14 and output 16 windows, where θ (the angle of rotation) of one window with respect to the other is continuously variable. The front (input) window 14 of the cell in this view has a fixed orientation while the rear (exit) window 16 is free to be mechanically rotated by a user. In general, both windows can be free to rotate, to facilitate easy matching of the incident polarization to the director at the input window.

This new optical device has three main particular features. First, it can continuously rotate linear polarization by any angle. Second, this rotation is wavelength independent. Third, it has a very wide field of view. All these properties are independent of the pulse width of the incident light. No other optical device has all these features together.

Referring to FIG. 1, which indicates the linearly polarized light beam 12, which enters through input window 14 and emerges appropriately, polarized from output window 16. The CVW-IPR has a first static mount 22, which can be mounted on an external support (later shown in FIG. 9) via threaded hole 19. The rotating mount 24 is secured to a second static mount 23, which is in turn rotably attached to static mount 22 by screws 26 which pass through spacing springs 18. A window 14 with oriented surface is fixed to static mount 22 and the second window 16 with its oriented surface is affixed to rotating mount 24. A ring spacer 32 is positioned between windows 14 and 16 and the TNLC 34 fills the volume enclosed by windows 14 and 16 and spacer 32. Adjustable screw 26 and its spacer spring 18 are shown at the top of FIG. 1 adjacent to the rotation screw 38, which provides the action to rotate the movable mount 24.

Spring 18 enables the device to be assembled, and by expanding mounts 22 and 24 facilitates proper alignment and allows precise adjustment of spacer 32 so that the operator can rotate the movable mount while retaining the TNLC 34 in the volume enclosed by windows 14 and 16 and spacer 32. The springs limit the user from over tightening screws 26 which would over compress spacer 32. Alternatively spring 18 could be removed by decreasing the pitch of screw threads on screws 26 allowing finer compression control.

Figure 2:
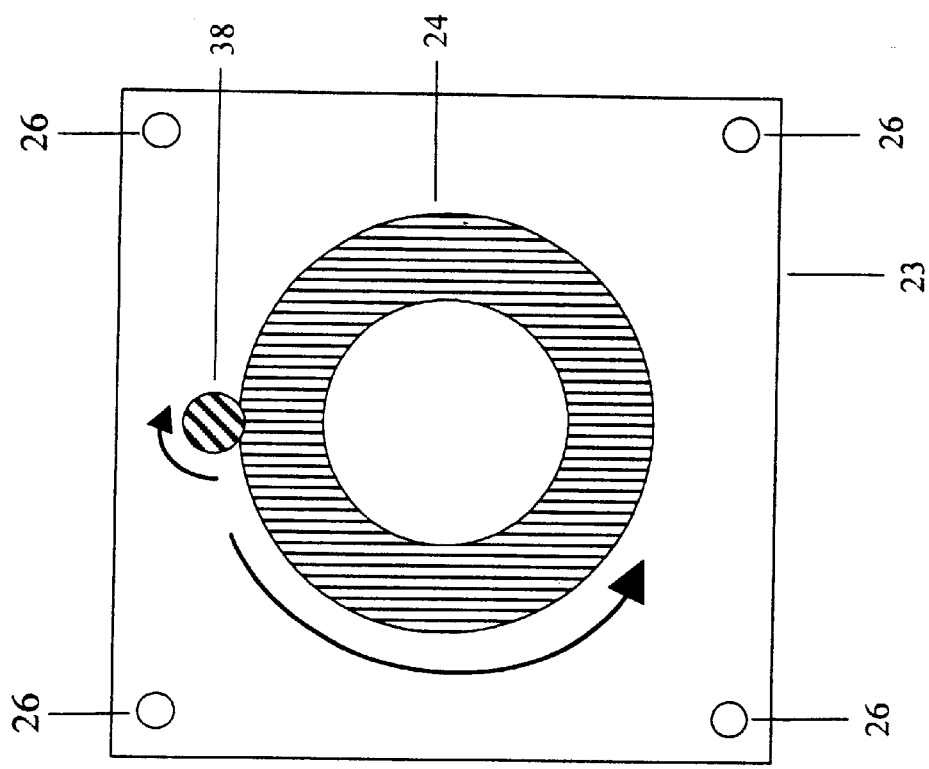
FIG. 2 shows a rear view of the CVW-IPR of FIG. 1 along the opposite direction of emerging lightbeam 12.

FIG. 2 shows a rear view of the CVW-IPR in the opposite direction of emerging light beam 12 in which lower and upper screws 26, rotating mount 24, window 16 and the second static mount 23 are shown. The TNLC 34, is seen through windows 16 which is rotated as desired during operation. Rotation of precision screw 38 in the clockwise direction causes the rotating mount to move counter-clockwise as illustrated, and vice-verse.

Windows 14 and 16 may be made of any high quality isotropic (non-polarizing) optical material. Useful examples of such optical material include examples such as BK7 for visible and near infrared wavelengths, fused silica for visible and ultraviolet wavelengths, polycrystalline ZnSe for near and far infrared, etc., depending on the wavelength range over which the CVW-IPR is to be used. In the embodiment described herein, the material used was BK7, a well known and widely used optical glass manufactured by Schott Glass, Inc. and Hoya Corporation. The thickness of the glass can be for example approximately 1 to 2 mm. Prior to assembly the internal surfaces of windows 14 and 16 were previously coated with a thin (approximately 100 microns) layer of polyvinyl alcohol which was then oriented by rubbing with a piece of soft cloth in only one direction, as is standard for preparation of TNLC cells. An alternative means of orienting these surfaces is to coat them with polyvinyl cinnamate and orient them by irradiation with linearly polarized ultraviolet light. Other variation of these methods for orienting the surfaces prior to assembly of the CVW-IPR may also be used.

A ring spacer 32 of approximately 110 microns thickness was positioned between the windows 14 and 16 by gluing it to either one of the windows. The space thickness defines the thickness of the liquid crystal. For wavelength independent operation, it has been found that that the TNLC pitch, which determines the thickness of the TNLC layer through which the light beam 12 passes, should be at least 40 times the longest wavelength for which the device is designed. The TNLC liquid crystal 34 used for the CVW-IPR was type E7 from EM Industries Inc., but any liquid crystal in the nematic phase will work. As earlier noted in FIG. 2, rotation of rotating mount 24 can be achieved with a precision screw 38 to change the rotation angle θ from 0° to 360° that can be physically rotated in a clockwise direction, alternatively, the screw 38 can be rotated counter clockwise to rotate the mount 24 in a clockwise direction.

Figure 3:
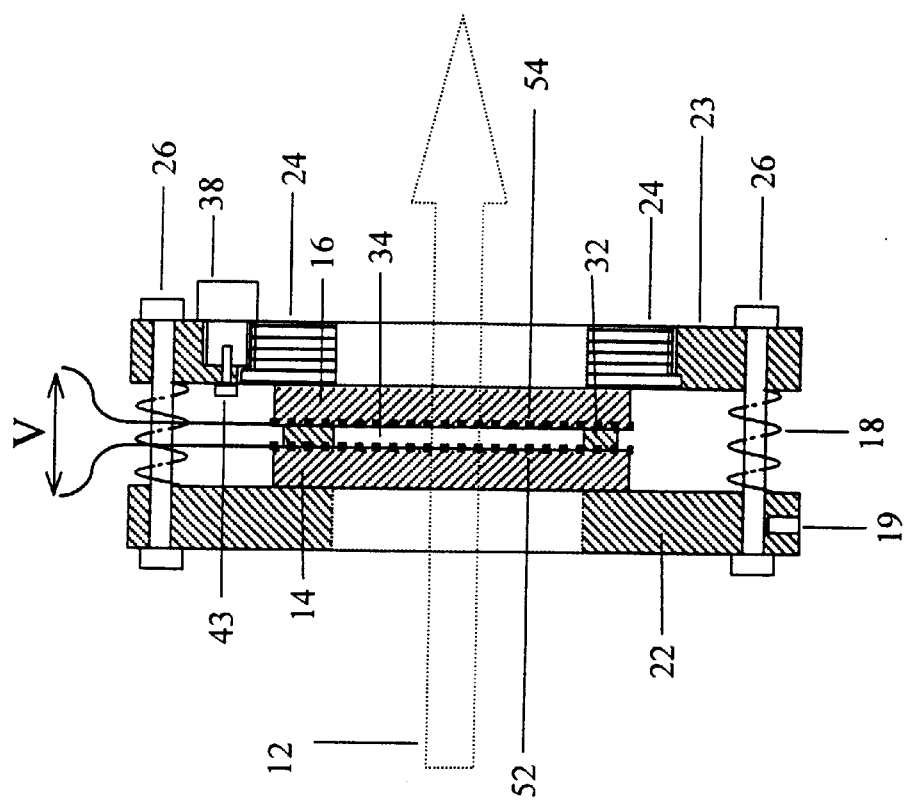
FIG. 3 shows the switchable CVW-IPR of FIG. 1 using two Indium Tin Oxide (ITO) transparent electrodes.

A small modification to the CVW-IPR can make it electrically switchable between rotating and non-rotating states. FIG. 3 shows the switchable CVW-IPR using two ITO transparent electrodes 52 and 54. Commercially available glass windows, pre-coated on one surface with ITO, obtained from Delta technologies, Inc. were used. A thin PVA layer was coated over the ITO and oriented with cloth as before. The ITO coatings 52 and 54 were electrically connected to an external voltage source V. Apart from the ITO coatings, the device is identical to the standard CVW-IPR in FIG. 1. With no voltage applied, the device rotates polarization, as does a standard CVW-IPR described above. Upon applying an ac or dc voltage in excess of 30 V across the ITO electrodes 52 and 54, the liquid crystal molecules align with the field, removing their nematic alignment and hence the rotation is switched off. This allows applying an electrical field to the electrodes 52 and 54 whereby one can have two different states, on/off for any specific rotation angle.

Figure 4:
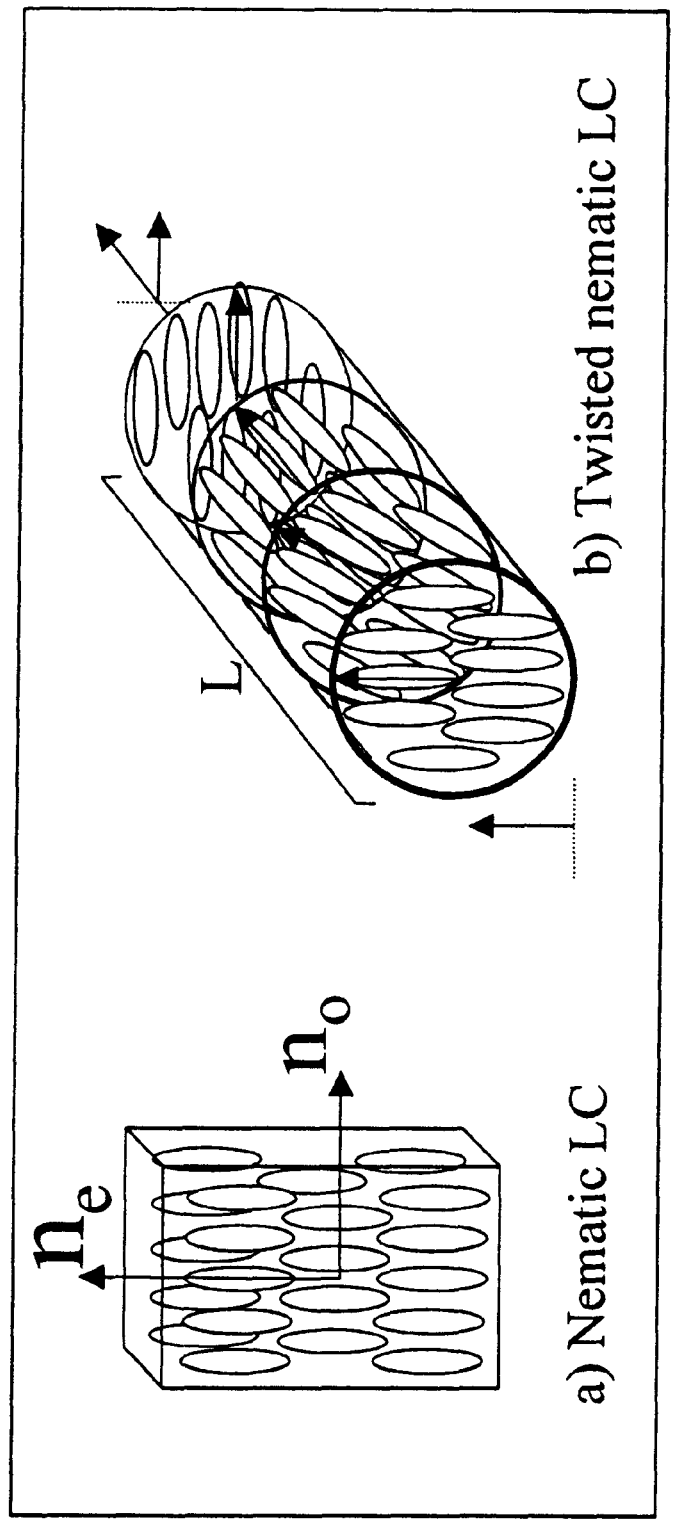
FIG. 4a illustrates the molecular arrangement for a nematic liquid crystal (NLC).
FIG. 4b illustrates the molecular arrangement for a twisted nematic liquid crystal (TNLC).

In the discussion of the prior art, it was noted that both nematic liquid crystals (NLC) and twisted nematic liquid crystals (TNLC) are known. FIGS. 4a portray the molecular arrangement for a (NLC); and, 4b the molecular arrangement for a (TNLC). In the liquid state, the molecules tend to align parallel to each other. By placing the liquid crystal in a cell with an oriented glass surface, the liquid crystal molecules align with the surface orientation. If the opposite glass window of the cell is also oriented the molecules at that side of the cell will align in the orientation of that window. If the two orientations are different, the orientation of the LC will gradually change, forming a helix. This is known as a twisted nematic liquid crystal (TNLC), which is widely used in numerous commercially available systems including displays for wristwatches, calculators, computer display screens, etc.

If linearly polarized light is incident on a TNLC cell with polarization vector parallel to (or perpendicular to) the director vector at the entrance window, the linear polarization follows the rotation of the director vector and hence exits with linear polarization parallel to (or perpendicular to) the director vector at the direction of the exit window.

Hiap Liew Ong in his article determined the Jones matrix for the most general case and obtained the following general expression for the transmittance of a TNLC between two polarizers.

$$T = \cos^2(\theta - \phi_o + \phi_i) + \sin^2\left(\theta \cdot \sqrt{1+u^2}\right) \cdot \sin 2(\theta - \phi_o) \cdot \sin 2\phi_i +$$
$$\frac{1}{2 \cdot \sqrt{1+u^2}} \cdot \sin\left(2 \cdot \theta \cdot \sqrt{1+u^2}\right) \cdot \sin 2(\theta - \phi_o + \phi_i) -$$
$$\frac{1}{1+u^2} \cdot \sin^2\left(\theta \cdot \sqrt{1+u^2}\right) \cdot \cos 2(\theta - \phi_o) \cdot \cos 2\phi_o$$

where, $$u = \frac{\pi \cdot d}{\theta \cdot \lambda} \cdot \frac{n_e}{n_o \cdot \sqrt{1 + v \cdot \sin^2\phi_s}} - n_o, \quad v = \left(\frac{n_e}{n_o}\right)^2 \quad (1)$$

Here $\theta$ is the angle between the entrance and exit director vectors of the sample (rotation angle), $\phi_i$ and $\phi_o$ are the angles between the entrance director vector and the first and second polarizer, respectively. $\phi_s$ is the uniform pretilt angle (a measure of the liquid crystal orientation at the surface), d is the cell thickness, $n_e$ and $n_o$ are the refraction indexes of the NLC (extraordinary and ordinary, respectively), and $\lambda$, is the incident light free space wavelength.

For a simple case when $d \gg \lambda$, if the TNLC is placed between two broad band polarizer and, $\phi_i$ and $\phi_s$, are equal to 0°, the normalized transmittance may be expressed as:

$$T \cong \cos^2(\theta - \phi_o). \quad (2)$$

One can see that the maximum transmittance is reached when the beam polarization at the exit of the sample is parallel to the second polarizer. Furthermore, it is known from the simple equation 2 above that there is no dependence of the transmittance on the radiation wavelength. Thus one would expect the same behavior for any $\lambda$.

Figure 5:
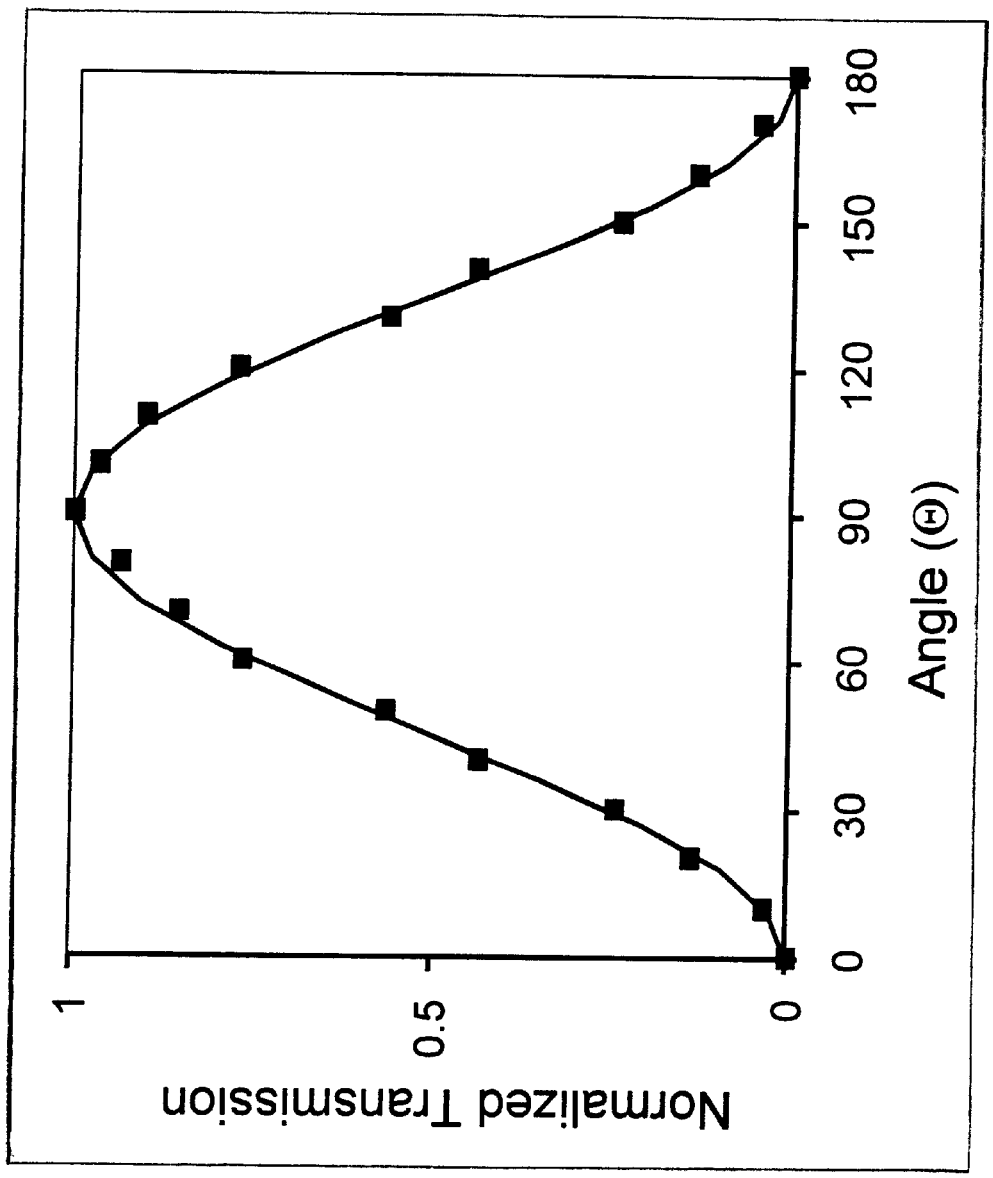
FIG. 5 graphically presents the measured transmittance of the CVW-IPR between crossed polarizers (filled squares) vs rotation angle, $\Theta$, using a 10 mW cw He—Ne LASER whereas the solid line is the theoretical calculation using Equation 2. The input polarizer is aligned parallel to the input director, so that $\phi_i=0$.

In FIG. 5, the measured normalized linear transmittance versus the rotation angle $\theta$ (filled squares) is shown for a CVW-IPR between perpendicular polarizers ($\phi_o = 90°$) with the input polarization parallel to the director at the input face ($\phi_i = 0$). It is seen from FIG. 5 that the experimental points match closely with the theoretical behavior of Eq.2 (solid Line). The measurements were made using a 10 mW cw He—Ne.

Figure 6:
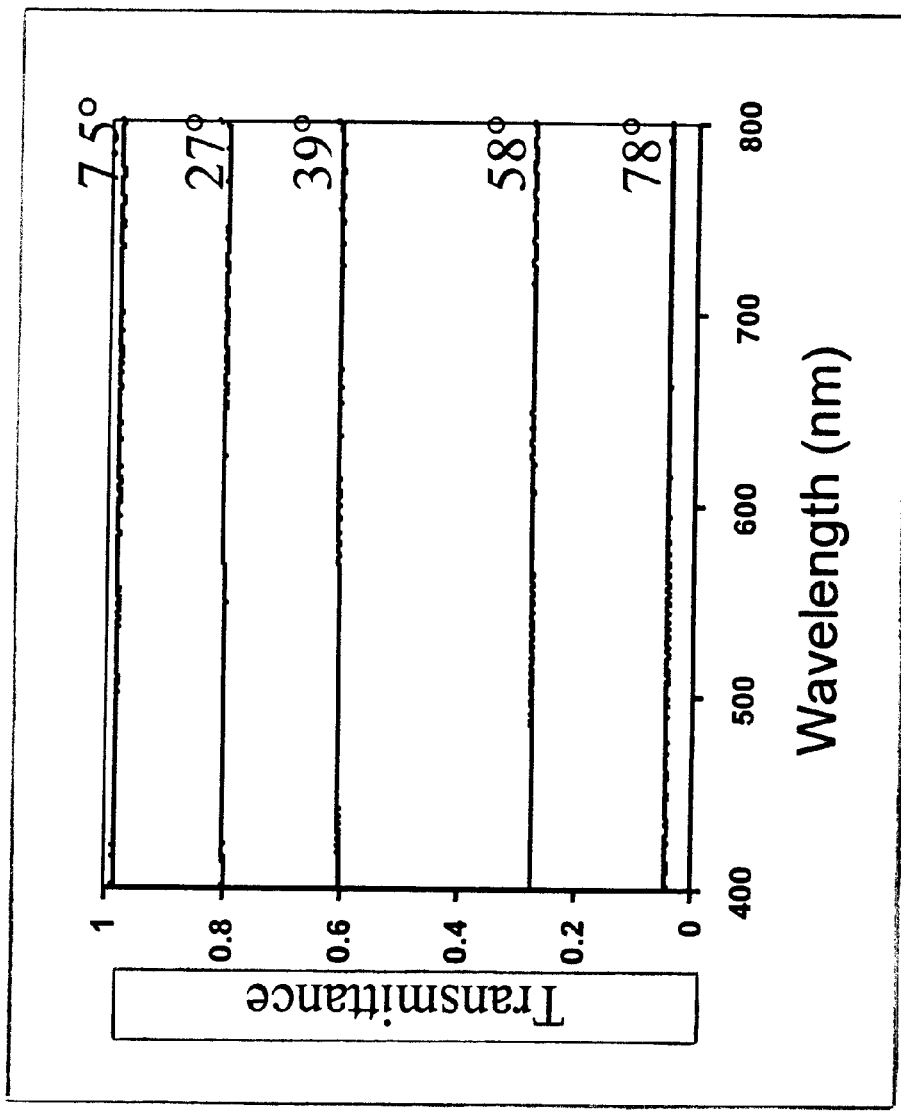
FIG. 6 graphically presents the transmittance of white light transmitted through the CVW-IPR between parallel broadband polarizers versus wavelength at different rotation angles θ.

In order to demonstrate the wavelength-independent nature of this device, a similar experiment to above was performed using a white light source instead of a laser. The source was a white-light continuum pulse, generated in a 2 mm thick sapphire window pumped by a 1 µJ, 150 femtosecond laser pulse at a wavelength of 775 nm. FIG. 6 shows spectra of the transmitted light measured at different rotation angles $\theta$ (7.5°, 27°, 39°, 58° and 78° C.). In this case, the rotator was placed between parallel broadband calcite polarizers.

Figure 7:
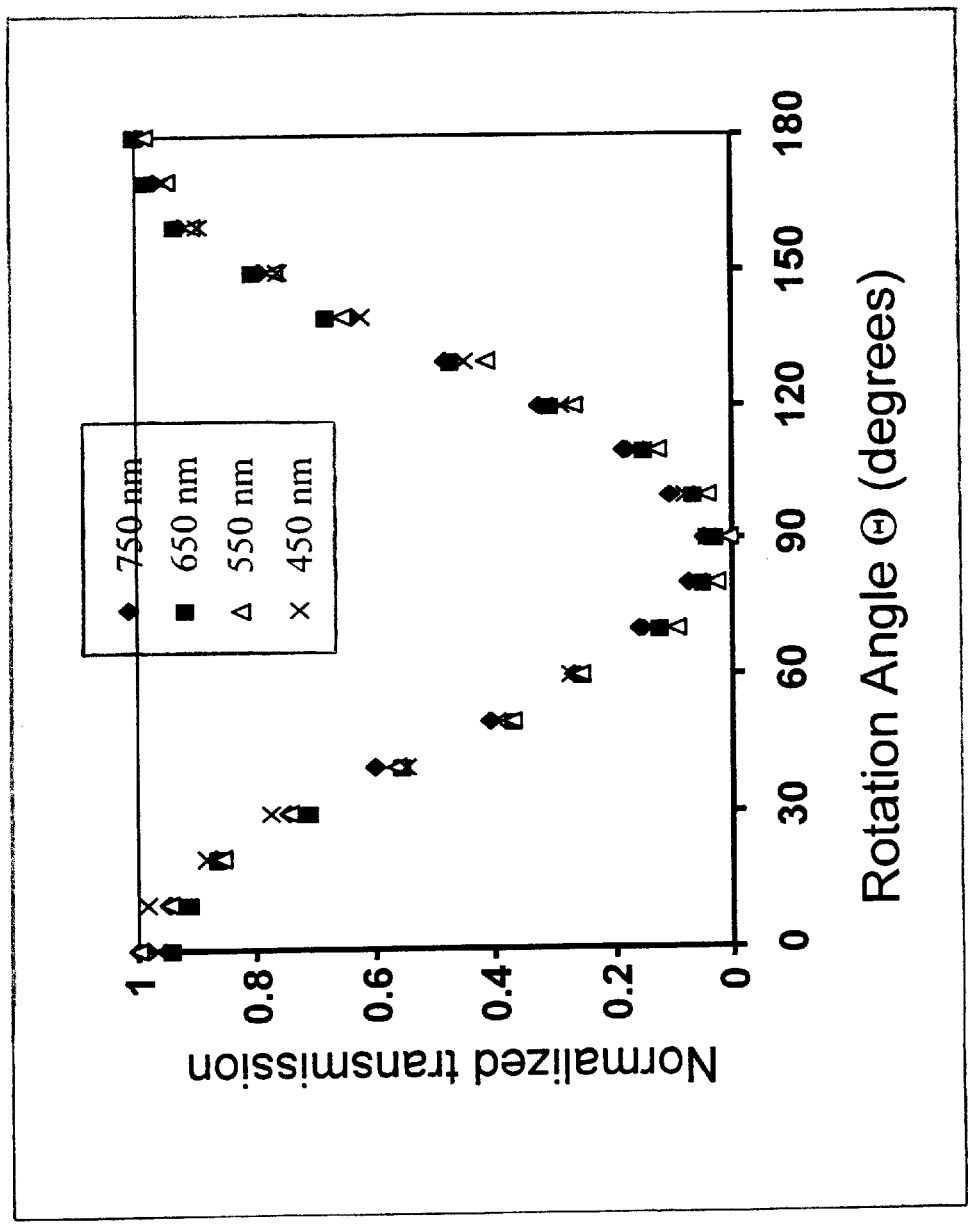
FIG. 7 shows the transmittance of the CVW-IPR versus rotation angle Θ between parallel polarizers for several wavelengths, extracted from the data in FIG. 7.

The normalized transmittance of the whole spectrum decreases uniformly (independent of wavelength) as the angle $\theta$ is increased. In FIG. 7 the transmittance is plotted against $\theta$ for four different wavelengths (450 nm, 550 nm, 650 nm, and 750 nm) which are indicated by the various symbols. Clearly the behavior is identical for all wavelengths as all four plotted curves follow the behavior of Eq.2.

Figure 8:
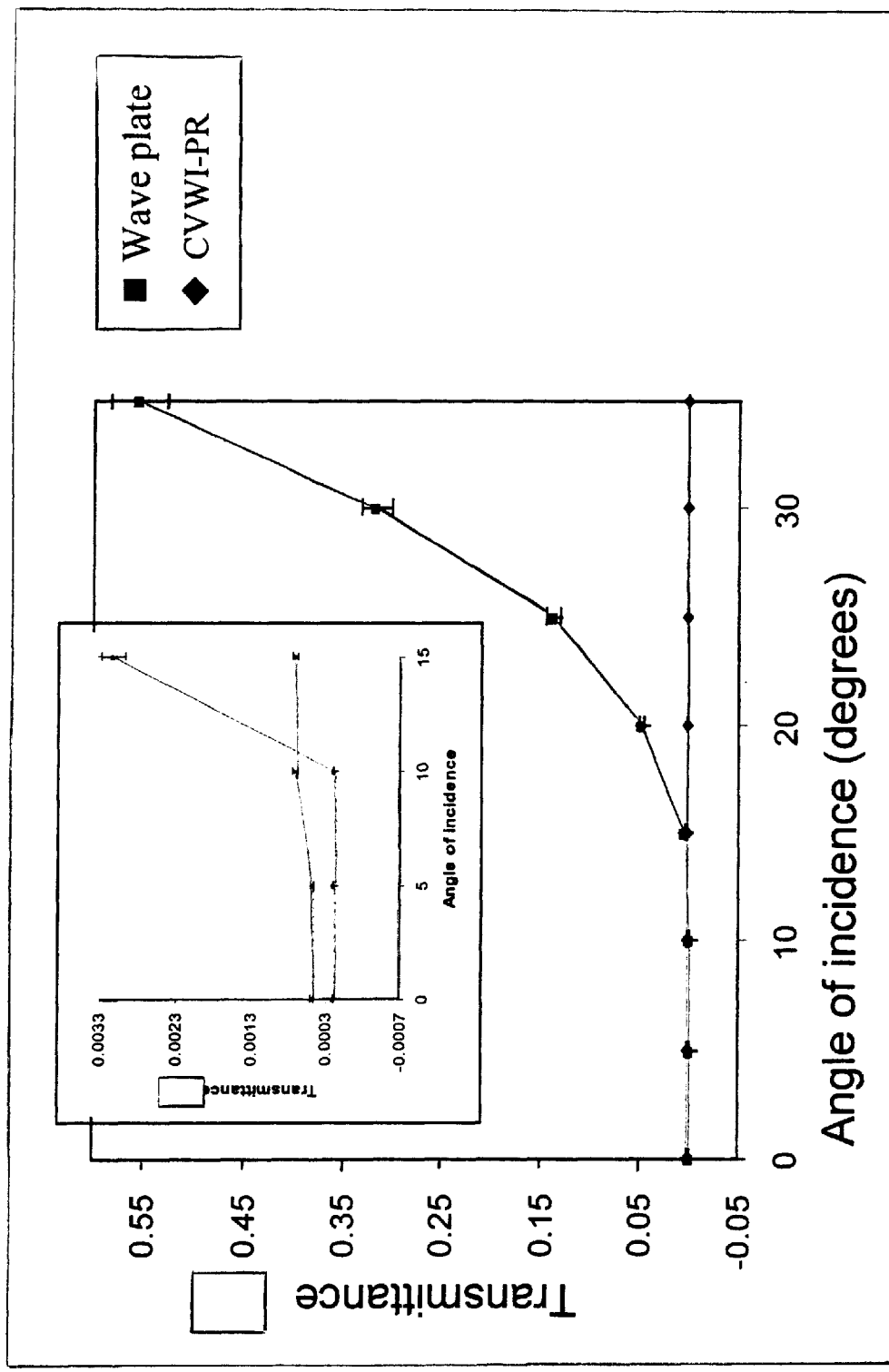
FIG. 8 shows the transmittance of the CVW-IPR and a 632.8 nm half wave plate, both set to 90° rotation and placed between parallel polarizers, as a function of angle of incidence with respect to the normal.

Another interesting and useful property of this device is its wide field of view. With the incident light polarized perpendicular to the entrance director, the polarization rotation is independent direction of propagation of the light through the liquid crystal, resulting in a very large field of view. The off-axis performance of the CVW-IPR was measured and compared to the performance of a standard multiple-order half-wave ($\lambda/2$) plate. Refer now to FIG. 8 which shows the measured extinction ratio versus the angle of incidence for a CVW-IPR and a multiple order, 632.8 nm $\lambda/2$ plate between parallel polarizers. The CVW-IPR and the $\lambda/2$ plate were set to give maximum extinction at normal incidence and the normalized transmittance of the system was then measured as a function of angle of incidence, where the plane of incidence was maintained perpendicular to the incident polarization. As seen in FIG. 8, the polarization rotation of the CVW-IPR is quite independent of the angle of incidence. In this experiment the linear polarization vector of a He—Ne beam (632.8 nm) was parallel to the cell director vector at the entrance. This is the only condition to be respected. As expected, the wave plate did not perform well off-axis. This is because the path length increases as the incidence angle is changed. Therefore, the phase shift between o and e polarizations is no longer $\pi$ and the output becomes elliptically polarized. The measured linear transmittance of the CVW-IPR is >90% and the extinction ratio is $<3 \times 10^{-4}$.

Figure 9:
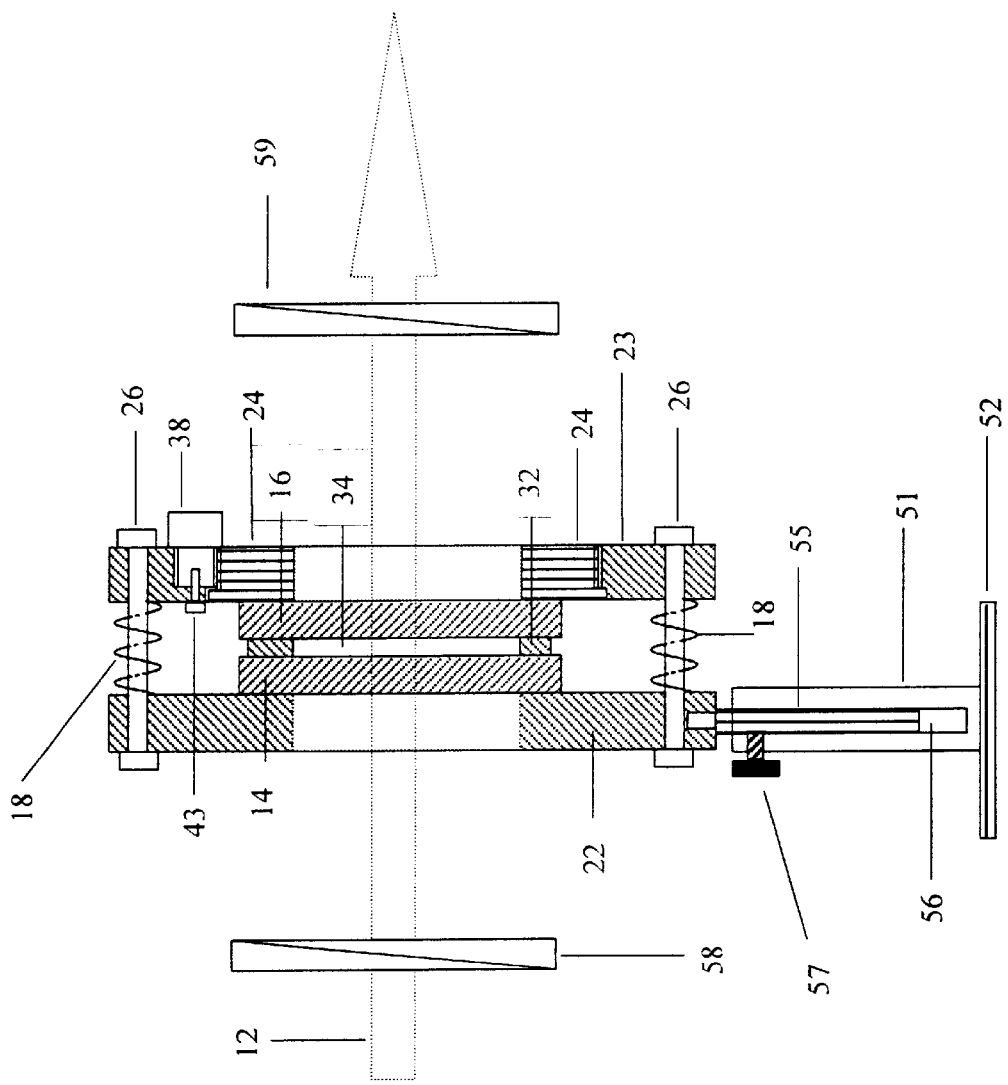
FIG. 9 shows another cross-sectional/side view of FIG. 1 with the invention mounted in a stand.

As earlier noted the cross-sectional view of FIG. 9, shows the CVW-IPR positioned in a stand 51 with a base 52. A pedestal 55 extending from the static mount 22 is secured in a cooperating cylindrical hole 56 by base screw 57. Also shown is an input polarizer 58 to ensure the incident light beam 12 is polarized parallel to the director at the input window 14 and output polarizer 59 to provide variable attenuation of light beam 12 as out put window 16 is rotated.

In conclusion, there has been developed a useful optical device that rotates the linear polarization of light of all wavelengths identically and simultaneously by any angle. This optical device has different applications such as: variable-angle polarization rotator; in combination with broadband polarizers as an optical power or energy attenuator; working in both cases as a wavelength independent and temporal pulse width independent device. The low cost, the very wide field of view, the wavelength and pulse width independence, and its mechanical simplicity make of this new optical device an important advance in the moderation of infrared, visible and ultraviolet radiation.

Figure 10:
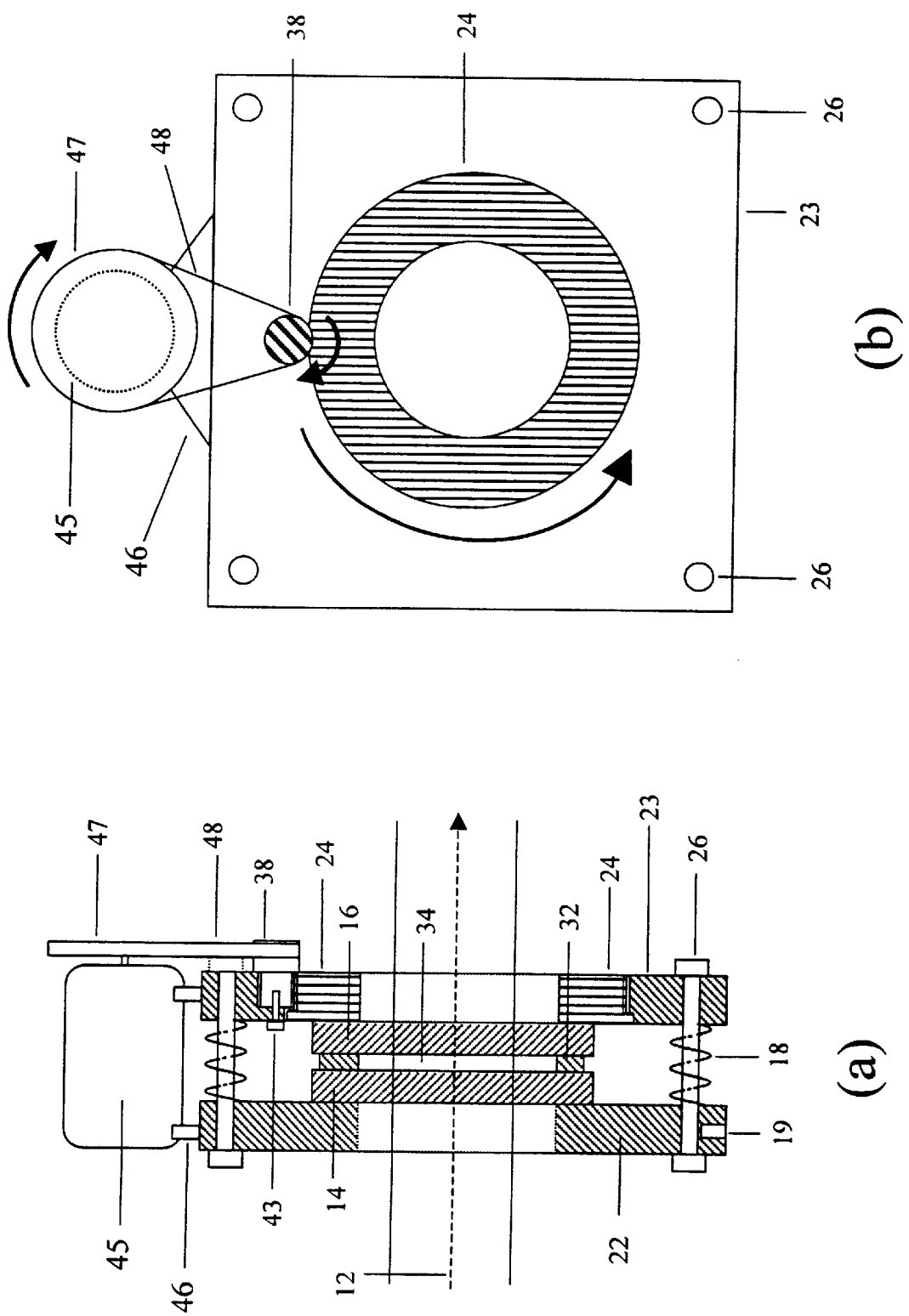
FIG. 10 illustrates a motorized CVW-IPR with 10(*a*) showing the cross-sectional side view and 10(*b*) the end view in the opposing direction of exiting light beam 12.

Although the device is described as having physically rotatable components, the invention can operate with rotatable components that can be electrically powered to rotate. While the rotatable adjustment components are described as screws, other types of rotatable components such as but not limited to rotatable knobs can be used. An alternative to the rotation of the movable mount 16 by the screw 38 as shown in FIG. 1 and FIG. 2 is to motorize its rotation as illustrated in both FIG. 10a and FIG. 10b. Although the motorization could be achieved in many ways FIG. 10a shows a motor 45, mounted onto the CVW-IPR via two mounting flanges 46. A gear wheel 47, on the motor axle drives the rotation screw 38 via a drive belt 48. FIG. 10b, the end view, also pictures driving the rotation screws 38 clockwise to cause 24 to rotate counter clockwise by means of gear wheel 47 and its associated drive belt 48.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical device for rotating the polarization of linearly polarized infrared, visible and ultraviolet radiation, comprising:

an input transparent window with oriented surface coating;

an output transparent window with oriented surface coating;

a twisted Nematic liquid crystal disposed between said coated windows;

a spacer located between the input window and the output window;

means for facilitating proper alignment and precise adjustment of the spacer; and control means that when continuously rotating in a first direction continuously rotates one of said input window and said output window, in a second direction opposite to the first direction, whereby the direction of polarization of linearly polarized radiation entering or exiting the device is continuously rotated.

2. The device of claim 1, wherein said windows are coated with electrically conductive yet transparent coatings, which upon application of a voltage causes the rotation to be switched off.

3. The device of claim 1, disposed between broadband polarizers to form a wavelength independent optical attenuator.

4. The device of claim 1, wherein said radiation is a laser beam generated by a laser source.

5. The device of claim 1, wherein said radiation includes a frequency range of approximately $10^{13}$ to approximately $10^{15}$ Hz.

6. The device of claim 1, wherein the control means includes: a rotatable screw for allowing an enhanced precision rotation of one of said input window and said output window.

7. The device of claim 1, wherein the control means includes: a rotatable knob for allowing an enhanced precision rotation of one of said input window and said output window.

8. The device of claim 1, wherein the control means includes: a motor for rotating the control means in a precision rotation.

9. The device of claim 8, wherein the control means further includes: a drive belt connecting the motor to the control means.

10. The device of claim 1, further comprising:

a support stand for supporting the device is a raised position.

11. A method of rotating the polarization of radiation comprising the steps of:

(a) introducing the radiation onto a first surface-coated window transparent to said radiation;

(b) passing said radiation through a twisted Nematic liquid crystal cell;

(c) thereafter passing said radiation through a second surface-coated transparent window;

(d) rotating a controller in a first direction which causes one of the said first and the said second windows to rotate in an opposite direction whereby the polarization of output radiation is rotated with respect to input radiation; and (e) facilitating proper alignment and precise adjustment of a spacer located between the first window and the second window.

12. The method of claim 11, further including the step of forming a wavelength independent optical attenuator by positioning said twisted Nematic liquid crystal cell between broadband polarizers.

13. The method of claim 11, wherein the step of rotating the controller includes the step of:

rotating a screw for precision rotation.

14. The method of claim 11, wherein the step of rotating the controller includes the step of:

rotating a knob for precision rotation.

15. The method of claim 11, wherein the step of rotating the controller includes the step of:

motorizing the controller for precision rotation.

16. A method of rotating the polarization of radiation comprising the steps of:

(a) introducing the radiation onto a first window;

(b) passing said radiation through a liquid crystal cell;

(c) thereafter passing said radiation through a second window;

(d) rotating a controller in a first direction which causes one of the said first and the said second windows to rotate in an opposite direction whereby the polarization of output radiation is rotated with respect to input radiation; and facilitating proper alignment and precise adjustment of a spacer located between the first window and the second window.

* * * * *